United States Patent [19]
Zia Rouhani

[11] 3,961,923
[45] June 8, 1976

[54] VAPOR-LIQUID SEPARATOR
[75] Inventor: S. Zia Rouhani, Nykoping, Sweden
[73] Assignee: Aktiebolaget Atomenergi, Stockholm, Sweden
[22] Filed: July 3, 1974
[21] Appl. No.: 485,566

[30] Foreign Application Priority Data
July 16, 1973 Sweden............................ 73099491

[52] U.S. Cl.............................. 55/457; 55/DIG. 22; 55/DIG. 23
[51] Int. Cl.².......................................... B01D 45/12
[58] Field of Search............ 55/456, 457, 458, 464, 55/DIG. 22, DIG. 23, 447; 209/211, 144; 210/512 R, 512 M; 122/34, 488

[56] References Cited
UNITED STATES PATENTS

| | | | |
|---|---|---|---|
| 1,038,707 | 9/1912 | Yeomans...................... | 55/456 X |
| 1,215,935 | 2/1917 | Hickman...................... | 55/457 X |
| 1,534,833 | 4/1925 | Binks........................... | 55/464 |
| 1,809,438 | 6/1931 | Chase........................... | 55/457 |
| 2,226,127 | 12/1940 | Harmon....................... | 55/418 X |
| 2,667,944 | 2/1954 | Crites........................... | 55/457 X |
| 2,936,043 | 5/1960 | Armstrong et al............ | 55/457 X |
| 3,009,539 | 11/1961 | Papp............................ | 55/457 X |
| 3,169,842 | 2/1965 | Streete et al................. | 55/457 X |
| 3,173,771 | 3/1965 | Barrett et al................. | 55/457 X |
| 3,407,575 | 10/1968 | Krizman....................... | 55/456 X |
| 3,448,563 | 6/1969 | Sobeck......................... | 55/457 X |
| 3,481,120 | 12/1969 | Lustenader.................. | 55/457 X |
| 3,517,821 | 6/1970 | Monson et al................ | 55/457 |
| 3,693,329 | 9/1972 | Willis........................... | 55/457 |
| 3,707,830 | 1/1973 | Gostavsson.................. | 55/348 X |
| 3,766,719 | 11/1973 | McAnally..................... | 55/457 X |

*Primary Examiner*—Frank W. Lutter
*Assistant Examiner*—David L. Lacey
*Attorney, Agent, or Firm*—Toren, McGeady and Stanger

[57] ABSTRACT

In a separator, a vapor-liquid mixture is passed upwardly through a pipe over an annular arrangement of curved vanes which whirl the mixture and effect the separation of its vapor and liquid components as it continues to flow upwardly above the vanes. Viewed in vertical section, each vane has a curved cross-section with its radius of curvature increasing from its radially inner end to its radially outer end. The vanes have the form of a section of the outer surface of a right circular cone whose axis extends transversely of the axis of the pipe containing the vanes and whose height is less than the diameter of the portion of the pipe containing the vanes.

13 Claims, 4 Drawing Figures

VAPOR-LIQUID SEPARATOR

SUMMARY OF THE INVENTION

The present invention is directed to a vapor-liquid separator and, more particularly, to the arrangement of curved vanes located in the flow path of the vapor-lquid mixture as it passes through a pipe.

The present invention is specifically directed to a separator for use in a water-cooled nuclear reactor. The separator includes a pipe for conducting the steam-water mixture from the nuclear reactor with an annular arrangement of radially extending vanes positioned in the pipe to cause the steam-water mixture to whirl or rotate. After passing over the vanes, the whirling action imparted to the mixture separates it into a steam component which flows into an outlet pipe coaxial with the pipe containing the vanes and a water component which flows from the pipe into an outlet channel. Vanes of various types have been tried in known separators of this kind, such as flat vanes, propeller-shaped vanes and vanes curved in the shape of a cylindrical surface. The drawback experienced in these known separators is that they do not afford complete separation of the water from the steam, or they cause relatively high pressure losses.

Therefore, it is a primary object of the present invention, to provide a vane configuration which overcomes the disadvantages experienced in the past and affords effective and efficient separation of the steam and water components in a steam-water mixture.

In accordance with the present invention, it has been found that a separator can operate efficiently and with low pressure losses if the vanes have a curved cross-section viewed in the direction of flow through the pipe and with the vanes, extending radially between a central body and the pipe, shaped so that the radius of curvature of the vanes increases from their radially inner ends to their radially outer ends. Preferably, the vanes have substantially the shape of the outer surface of a cone having a top angle in the range of 50° to 70°, with the axis of the cone extending transversely of the axis of the pipe and with the apex of the cone located within the limits of the pipe containing the vanes. Preferably, the separator is arranged so that the axis of the pipe containing the vanes is vertical. The lower edges of the vanes preferably form an angle in the range of 0° to 5° with the axial direction of the pipe, while the upper edges of the vanes preferably form an angle in the range of 60° to 70° with the axial direction of the pipe. The upper edge of the vane should be rectilinear, that is, it should extend along a generatrix of the cone. Furthermore, the upper edge of the vanes should extend approximately radially of the pipe. Further, when the pipe is arranged vertically, the upper edge of the vane should be substantially horizontal. It is preferred if the vanes are disposed in an annular formation extending outwardly from a cylindrically shaped central body arranged coaxial with the pipe to the inner surface of a frusto-conical section of the pipe which diverges in the direction of flow. While the number of vanes may be in the range of 10 to 14, it is considered preferable to use 12.

The reason that the separator formed in accordance with the present invention affords superior separation with low pressure losses is presumed to be due to a continuity established in the process which starts already at the passage of the mixture on the vanes. Besides, it would appear that the vane shape prevents the occurrence of undesirable local backflow of the steam-water mixture at the radially outer sections of the vanes. The power saved by using this particular vane arrangement in a nuclear reactor is low calculated as a percentage, but calculated in absolute numbers it is considerable in view of the high power of the nuclear reactor. For example, in a nuclear power plant having an output of 750 MW, in which cooling water is circulated through the reactor by pumps driven by electric motors, the invention can result in a direct saving of 1500 kW in the pumping power, that is, 0.2% of the total output, in comparison with a reactor using similar separators having cylindrically curved vanes. To this may be added the savings which will be possible by reducing the necessary throttling at the flow inlet to the reactor core.

The separator vanes formed in accordance with the present invention can be manufactured by bending pieces of sheet metal to the desired shape. Alternatively, the vanes can be manufactured by casting. If in this case the vanes vary in thickness along their length, the concave surface of the vane should be given the desired shape.

DETAILED DESCRIPTION OF THE INVENTION

Figure 1:
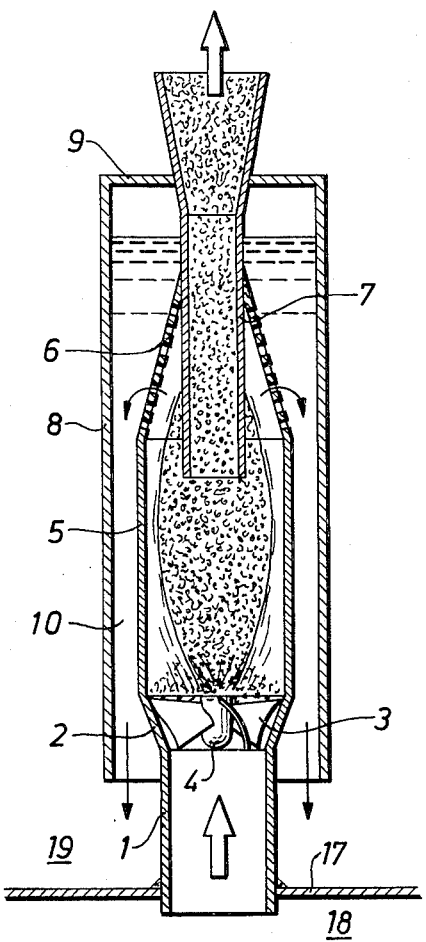
FIG. 1 is a vertical sectional vies of a vapor-liquid separator embodying the present invention.

In FIG. 1 a vapor-liquid separator is illustrated consisting of a pipe 1 for flowing a steam-water mixture from the upper part of the core 18 in a water-cooled nuclear reactor. The pipe 1 is fastened to the top wall 17 of the core 18. The reactor does not form part of the invention, and is not to be described here. As indicated by the arrow in pipe 1, the steam-water mixture flows upwardly from the cylindricallly shaped pipe 1 into a lower frusto-conically shaped section 2 whose walls diverge in the upward direction. Located within the frusto-conical section 2 are a plurality of curved vanes 3 disposed in an annular formation, spaced from one another, and extending radially outwardly from a cylindrically shaped central body 4 to the inner surface of the frusto-conical section 2. A cylindrically shaped pipe section 5, called an upcomer or separator cylinder, forms a continuation of the pipe 1 extending upwardly from the frusto-conical section 2 and terminating at its upper end in another frusto-conical section 6 which converges inwardly in the upward direction. As can be seen in FIG. 1, the upper frusto-conical part 6 is perforated. Arranged coaxially with the pipe 1 and extending downwardly through the upper frusto-conical section 6 into the upper end of the cylindrically shaped pipe section 5 is an outlet pipe 7 arranged to receive the separated steam component of the steam-water mixture. Laterally enclosing a portion of the outlet pipe 7 and the pipe sections 1, 2, 5 and 6 is a cylindrical pipe 8 which is closed at its upper end by an annular wall 9 extending between the upper end of pipe 8 and outlet pipe 7. Pipe 8, in combination with annular wall 9, forms an outlet channel for the water component of the steam-water mixture. It can be noted from the arrows shown in FIG. 1 that the separated water, after flowing upwardly into the upper frusto-conical section 6, flow outwardly into the outlet channel 10 and then downwardly and out through the bottom of the outlet channel.

As the steam-water mixture flows upwardly through the pipe 1, it passes over the vanes 3 which impart a whirling action to the mixture so that separation into the steam and water components takes place. The separating action is effected in the cylindrically shaped pipe section 5 with the steam component flowing centrally upwardly into the lower end of outlet pipe 7 while the water component, because it is heavier, flows upwardly along the inside wall of the pipe section 5 into the upper frusto-conical section 6 and passes outwardly through the perforations in that wall sections flowing into the outlet channel formed between pipe 8 and the outer surfaces of pipe sections 6, 5, 2 and 1. The water flows through the space 10, called a downcomer, through the space 19 above the wall 17, flows down to the bottom of the reactor, and is again brought to flow up through the core 18 while being heated to produce steam.

Figure 4:
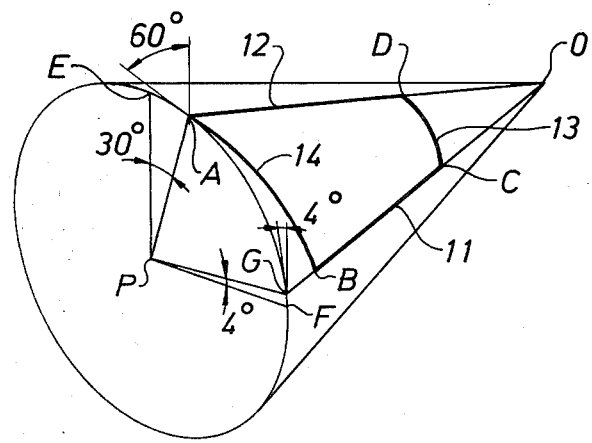
FIG. 4 shows the formation of a vane formed in accordance with the present invention from the outer surface of a cone.
Figure 2:
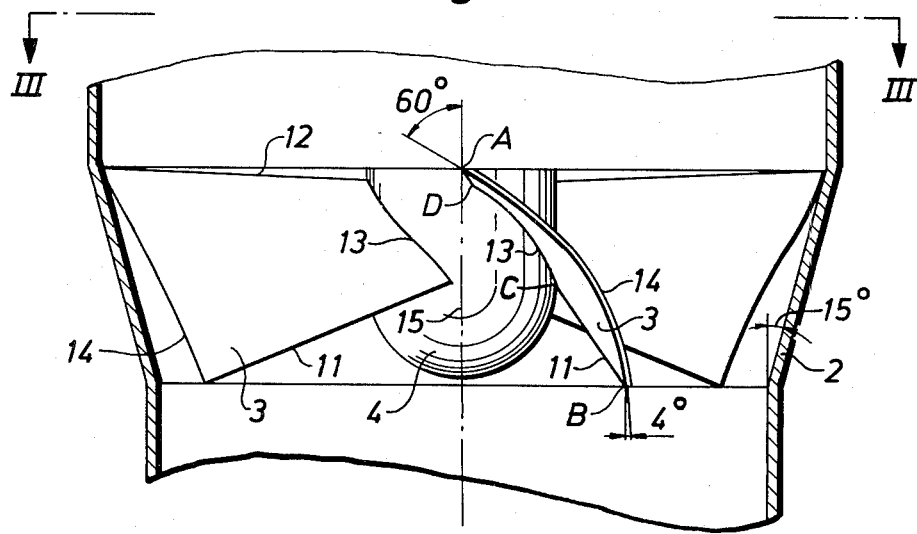
FIG. 2 is an enlarged detail of a portion of the separator shown in FIG. 1.
Figure 3:
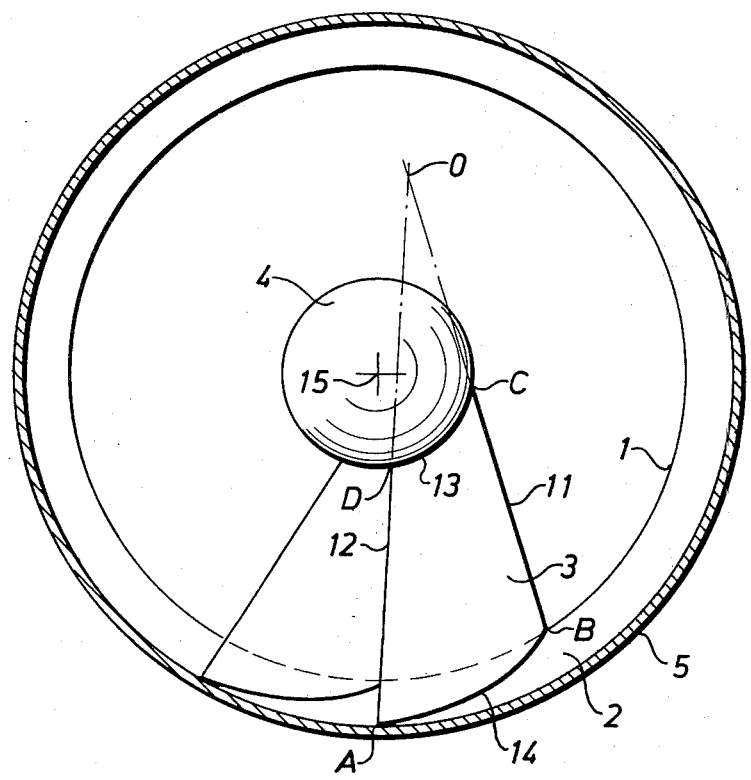
FIG. 3 is a transverse sectional view taken along line III—III in FIG. 2.

The configuration of the vanes 3 is illustrated in FIGS. 1 and 2; however, the shape of the vanes which embodies the present invention, can be most easily appreciated if one considers that the vanes have the configuration of the outer surface of the right circular cone, as shown in FIG. 4. In other words, if the material forming the vanes were originally shaped as the cone in FIG. 4, the vane could be cut out in the form designated by the reference characters A, B, C, D in FIG. 4. As illustrated in FIG. 4, the vane ABCD has the same orientation in space as the vanes 3 in FIGS. 2 and 3, that is, the lower and upper edges as viewed in FIG. 4 form the lower and upper edges of the vanes within the separator, while the edge 13 closer to the apex O of the cone forms the inner edge and the edge 14 closer to the base of the cone forms the outer edge, note FIGS. 2 and 3. As can be seen in FIG. 2, the upper edge 12 is substantially horizontal and, in position within the frusto-conical section 2, the upper edge is disposed at an angle of approximately 60° to the axial direction of the pipe 1. As viewed in FIG. 2, it can be noted that the vanes 3 in vertical section, have a curved configuration so that the lower edge 11 of the vanes form an angle of about 4° with the axial direction of pipe 1. The optimal value of this angle is, however, 0. This feature can be appreciated as shown in FIG. 4 where the relationship of the tangent at points A and G to vertical lines are shown as having angular differences of 60° and 4°, respectively.

In the bottom surface of the cone, that is, the base of the cone, the radius PE extends in a vertical plane, while the radius PF is in a horizontal plane. The relationship of the apex O of the cone to the diameter of the frusto-conical section 2 is illustrated with the apex being located between the axis of the pipe 1 and the inner surface of the frusto-conical section 2. In other words, the dimension between the axis 15 and the apex O is less than the radius of the pipe 1. The outer edge 14 of the vane 3 is secured to the inner surface of the frusto-conical section 2 while its inner edge 13 is secured to the central body 4 positioned coaxially with the pipe 1. As can be seen from FIG. 3, the upper edge of the vane extends approximately radially inwardly from the frusto-conical section 2 so that it is slightly offset from the axis 15 of the pipe 1. Preferably, the cylindrically shaped central body 4 has a diameter in the range of 25% to 35% of the diameter of the pipe 1. The top angle of the frusto-conical part 2 is suitably in the range of 20° to 40°, that is, the wall of the frusto-conical part 2 is inclined in the range of 10° to 20° to the vertical axis of the pipe 1. Where the top angle of the cone or the frusto-conical sections is referred to in this description, it indicates the angle formed between two generatrices on the diametrically opposite sides of the cone or frusto-conical section.

As can be noted from FIG. 4, the radius of curvature of the inner edge 13 of the vane 3 has a smaller radius of curvature than that of the outer edge 14 because of the distance of the edges from the apex O of the cone. While the number of vanes may vary from 10 to 14 in the annular formation about the central body 4, it is preferable if 12 vanes are used. In FIG. 4, the generatrix of the cone identified by the line ADO is spaced clockwise 30° from the vertical radius PE of the base of the cone. The outer generatrix which defines the lower edge 11 of the vane defined by the line GBCO is spaced 40° – 0° counter-clockwise from the horizontal radius PF. Accordingly, the angular dimension about the outer surface of the cone between the two generatrices and, therefore, between the upper edge and lower edge of the vane, is approximately 56°.

While a specific embodiment of the invention has been shown and described in detail to illustrate the application of the inventive principles, it will be understood that the invention may be embodied otherwise without departing from such principles.

I claim:

1. A separator for dividing a liquid-vapor mixture, such as a steam-water mixture, into its liquid and vapor components, comprising a vertically extending first pipe arranged to convey the liquid-vapor mixture from a source, a central body positioned within and spaced inwardly from said first pipe and extending in the axial direction of said first pipe, a plurality of vanes located within the extending approximately radially of said first pipe below the upper end thereof, said vanes arranged in spaced relationship to one another in an annular formation extending between said central body and said first pipe, said vanes arranged to whirl the liquid-vapor mixture within said first pipe as the mixture flows upwardly about said vanes, a vertically extending second pipe located within said first pipe with the lower end thereof spaced upwardly above said vanes and arranged to receive the vapor component of the mixture separated by the whirling action imparted to the mixture by said vanes, said second pipe being substantially co-axial with said first pipe, the upper end of said second pipe extends upwardly from the upper end of said first pipe, wall means laterally enclosing said first pipe and forming an annular outlet chamber therebetween for the separated liquid component and the upward end of said first pipe above the lower end of said second pipe being perforated to flow the separated liquid component into the outlet channel, the upper end of said second pipe being located above said wall means wherein the improvement comprises that each of said vanes has an upper edge and a lower edge relative to the vertical direction of said first pipe and an inner edge contacting said central body and an outer edge contacting the inner surface of said first pipe, each of said vanes has a curved cross-section in the axial direction of said first pipe extending from the lower edge to the upper edge thereof with the radius of curvature of each of said vanes increasing from the inner edge thereof to the outer edge thereof, each of said vanes being formed in the shape of a portion of the outer surface of an imaginary cone having a top angle in the range of 50° to 70° with the axis of the cone arranged transversely of the axis of the first pipe and the apex of the cone located inwardly of the inner surface of said first pipe, and the upper edge of said vanes is disposed approximately horizontally and the lower edge of said vanes slopes upwardly in the inward direction.

2. A separator, as set forth in claim 1 wherein said upper and lower edges of said vanes extend rectilinearly and are formed as part of the generatrices of the cone, said lower edge forming an angle of approximately 0° to the axial direction of said first pipe and said upper edge forming an angle in the range of 60° to 70° to the axial direction of said first pipe.

3. A separator, as set forth in claim 2, wherein said upper edge is oriented so that it is offset closely from and approximately intersects the axis of said first pipe at right angles.

4. A separator, as set forth in claim 1, wherein said upper and lower edges of said vanes extend rectilinearly and are formed as portions of generatrices of the cone, said lower edge forming an angle in the range of 0° to 5° to the axial direction of said first pipe and said upper edge forming an angle in the range of 60° to 70° to the axial direction of said first pipe.

5. A separator, as set forth in claim 4, wherein said first pipe includes a frusto-conical section with the wall thereof diverging in the upward direction, said central body positioned within said frusto-conical section co-axial with said pipe and spaced inwardly from the inner surface of said frusto-conical section, and said vanes being located within said frusto-conical section and extending approximately radially between said central body and said frusto-conical section.

6. A separator, as set forth in claim 4, wherein said first pipe comprises a plurality of serially arranged sections including a first frusto-conical section laterally enclosing the annular formation of said vanes with the wall of said frusto-conical section diverging in the upward direction, a lower cylindrical section extending downwardly from the lower end of said frusto-conical section and having a diameter substantially equal to the diameter of the lower end of said frusto-conical section, an upper cylindrically shaped section extending upwardly from the upper end of said frusto-conical section and having a diameter substantially equal to the diameter of the upper end of said frusto-conical section, the lower end of said second pipe being located below the upper end of said upper cylindrical section, a second frusto-conical section connected at the lower end thereof to the upper end of said upper cylindrical section and extending upwardly and converging inwardly therefrom into contact with the outer surface of said second pipe, said second frusto-conical section being perforated for affording passage of the liquid component from said first pipe into said outlet channel, said wall means forming the outlet channel comprising an upwardly extending cylindrically shaped section laterally enclosing said first pipe from a transverse plane below said vanes to another transverse plane located above the location of contact between said second frusto-conical section and said second pipe, and an annular shaped wall extending transversely of said upwardly extending cylindrically shaped section inwardly into contact with said second pipe above the point of contact between said second frusto-conical section and said second pipe with said annular shaped wall forming a closure for the upper end of said outlet channel.

7. A separator, set forth in claim 6, wherein said central body is closed ended and cylindrically shaped and has a diameter in the range of 25% to 35% of the diameter of said lower cylindrical section of said first pipe.

8. A separator, as set forth in claim 6, wherein the top angle of said first frusto-conical section is in the range of 20° to 40°.

9. A separator, as set forth in claim 1, wherein the imaginary cone forming said vanes is a right circular cone and each of said vanes has substantially the shape of a four-sided section of the outer surface of the imaginary cone from which it is formed, said central body being cylindrically shaped and arranged co-axially with said first pipe, said upper edge of said vanes extends along a generatrix of the imaginary cone from which it is formed and spaced approximately 30° from the intersection of the vertical radius of the base of the cone with its outer periphery, said lower edge located along another generatrix of the cone spaced approximately 4° upwardly from the intersection of the horizontal radius of the base of the cone with its outer periphery so that the generatrices containing said upper edge and said lower edge are spaced apart approximately 56° about the axis of the cone, and the generatrix containing said upper edge being offset closely from the axis of said first pipe.

10. A separator, as set forth in claim 9, wherein the number of said vanes is in the range of 10 to 14.

11. A separator for dividing a liquid-vapor mixture, such as a steam-water mixture, into its liquid and vapor components, comprising a vertically extending first pipe arranged to convey the liquid-mixture from a source, a central body positioned within and spaced inwardly from said first pipe and extending in the axial direction of said first pipe, a plurality of vanes located within and extending approximately radially of said first pipe and spaced between the ends of said first pipe, said vanes arranged in spaced relationship to one another in an annular formation extending between said central body and said first pipe, said vanes arranged to whirl the liquid-vapor mixture within said first pipe as the mixture flows about said vanes, a vertically-extending second pipe located within said first pipe and having an end located adjacent said vanes and spaced axially from said vanes and arranged to receive the vapor component of the mixture separated by the whirling action imparted to the mixture by said vanes, said second pipe being substantially co-axial with said first pipe, wall means laterally enclosing said first pipe and forming an annular outlet chamber therebetween for the separated liquid components, said first pipe having an end located on the same side of said vanes as said second pipe and spaced further from said vanes than the end of said second pipe located adjacent said vanes, said end of said first pipe located on the same side of said vanes as said second pipe is perforated to allow the flow of the separated liquid component into the outlet channel, wherein the improvement comprises that each of said vanes has a first edge and a second edge spaced apart in the vertical direction of said first pipe and an inner edge contacting said central body and an outer edge contacting the inner surface of said first pipe, each of said vanes has a curved cross-section in the axial direction of said first pipe extending from the second edge to the first edge thereof with the radius fo curvature of each of said vanes increasing from the inner edge thereof to the outer edge thereof, each of said vanes being formed in the shape of a portion of the outer surface of an imaginary cone having a top angle in the range of 50° to 70° with the axis of the cone arranged transversely of the axis of the first pipe and the apex of the cone located inwardly of the inner surface of the said first pipe, and the first edge of said vanes is disposed approximately horizontally and the second edge of said vanes slopes toward the first edge in the inward direction, and the first edge of said vanes being located closer to said second pipe.

12. A separator, as set forth in claim 11, wherein said first edge is located vertically above said second edge.

13. A separator, as set forth in claim 11, wherein said first edge is located vertically below said second edge.

* * * * *